(12) United States Patent
Nakayama

(10) Patent No.: US 6,605,203 B1
(45) Date of Patent: Aug. 12, 2003

(54) ELECTRODE APPARATUS

(75) Inventor: Norio Nakayama, Tsukuba (JP)

(73) Assignee: Agency of Industrial Science and Technology, Tokyo (JP)

( * ) Notice: Subject to any disclaimer, the term of this patent is extended or adjusted under 35 U.S.C. 154(b) by 0 days.

(21) Appl. No.: 09/453,405

(22) Filed: Dec. 3, 1999

(30) Foreign Application Priority Data

Dec. 3, 1998 (JP) ............................................. 10-343713

(51) Int. Cl.[7] ...................... B01D 59/42; B01D 59/50; B01D 61/42; C02F 1/00; H05K 1/00
(52) U.S. Cl. ........................ 204/518; 205/758; 174/250
(58) Field of Search ...................... 174/250; 204/164, 204/515, 518; 205/758, 688, 743; 588/204

(56) References Cited

U.S. PATENT DOCUMENTS 4,367,132 A * 1/1983 Bell et al. ............... 204/180 R

FOREIGN PATENT DOCUMENTS

| JP | A4917369 | 2/1974 |
|---|---|---|
| JP | A104996 | 4/1989 |
| JP | A1503369 | 11/1989 |
| JP | A559716 | 3/1993 |
| JP | A8281247 | 10/1996 |

OTHER PUBLICATIONS

New Edition Data Guide Earth Environment, Aoki Shoten, pp. 238–241, Jun. 1995.

* cited by examiner

Primary Examiner—Chandrika Prasad
(74) Attorney, Agent, or Firm—Birch, Stewart, Kolasch & Birch, LLP

(57) ABSTRACT

There is disclosed an electrode apparatus, which comprises an electrode (1) composed of a conductor through which perforations (2) are formed from a surface to a backing surface, wherein when the conductor is maintained at an electric potential sufficient to cause an oxidation or reduction reaction to occur in substances to be treated (3) of a solution entered from an inlet of the perforation and passed through inside the perforation, the substances to be treated are captured or rendered harmless by their oxidation or reduction reaction inside the perforation, and the solution whose concentration is lowered is diffused from an outlet of the perforations. Accordingly to the electrode apparatus, it is possible to prevent leakage and/or diffusion of hazardous or harmful substances into the ambient environment in the event of breakage of equipment, such as a waste disposal landfill, by setting the electrode apparatus around the equipment and by capturing the hazardous or harmful substances, or rendering them harmless by their redox reaction.

19 Claims, 4 Drawing Sheets

ELECTRODE APPARATUS

FIELD OF THE INVENTION

The present invention relates to an electrode apparatus preferably suitable for treating of a solution containing hazardous substances, harmful substances, and the like, which solution soaks into the soil. More particularly, the present invention relates to an electrode apparatus capable of preventing a transfer or diffusion phenomenon of the hazardous substances, harmful substances, and the like, from an environment containing a high concentration of the hazardous substances, harmful substances, and the like, such as the soil around a general waste disposal landfill or an industrial waste disposal landfill, to an environment, such as the soil, a river, an underground water vein, and the like, distant from the former environment.

BACKGROUND OF THE INVENTION

At present, general waste and industrial waste are treated mainly by dumping and burying them, with them left as they are, in a general waste disposal landfill, industrial waste disposal landfill, and the like, or by incinerating them, to produce ashes, which are thereafter dumped and buried in a general waste disposal landfill, industrial waste disposal landfill, and the like. Since, however, heavy metals, such as mercury, lead, cadmium, and the like; dioxin, chloroform, cyanogen (cyanide), and other harmful inorganic or organic chemical substances ooze out of these wastes, as shown in, for example, "NEW EDITION DATA GUIDE EARTH ENVIRONMENT" AOKI SHOTEN, PP. 238~241, June 1995, countermeasures against them have been indispensable from the standpoint of environmental protection.

As a conventional method to protect against leakage/diffusion of these substances into the environment, for example, the aforementioned literature gave a method in which a shielding rubber sheet is spread on the bottom of a landfill, the waste is dumped thereon, and the seepage water from the waste is treated by transferring from a water-collecting tube mounted on the rubber sheet to seepage water-treating equipment; or a method in which the waste is completely sealed in concrete-made containing equipment buried in the soil. These methods are explained below by referring to FIGS. 5 and 6.

FIG. 5 is a cross section of a waste disposal landfill based on the former leakage/diffusion protection method. In this former method, a thin rubber-made shielding sheet 10, with a thickness of approximately 1~2 mm, is spread over a surface of sloping soil 9, the lower part of the slope is closed with a dam 7, and a waste 8 is dumped on the shielding sheet inside of the dam, which is then reclaimed. The seepage water containing the hazardous substances, harmful substances, and the like, which oozes out of the waste, is shielded by the shielding sheet and does not leak into the environment. The seepage water is collected from the surface of a water-collecting tube 11 and transferred to seepage-water-treating equipment 12 in which it is treated and purged, and thereafter it is released into the environment.

On the other hand, FIG. 6 is a cross section of a waste disposal landfill based on the latter leakage/diffusion protection method. The waste 8 is stored in exterior-walled equipment 16 having inside partition equipment 17. These equipments are made from concrete having unconfined compression strength of 250 kg/cm² or above, and a thickness of 10 cm or above and 15 cm or above, respectively. The waste is then covered by a cover 14, and the waste disposal landfill is provided with equipment to prevent the inflow of natural water, such as rainwater and the like, for example, equipment for preventing the inflow of rainwater 13, an open channel 15, and the like. Thus, leakage and diffusion of the hazardous substances, harmful substances, and the like into the soil 9 can be prevented by sealing off the waste completely in such a manner as described above.

The aforementioned conventional method of treating the waste, in which a shielding rubber sheet is spread on the bottom of a disposal landfill, and the waste is dumped thereon, and the seepage water from the waste is treated by transferring from a water-collecting tube mounted on the rubber sheet to seepage water-treating equipment; or the method, in which the waste is completely sealed in concrete-made containing equipment buried under the ground, can prevent the leakage and diffusion of the hazardous substances, harmful substances, and the like, if the equipment used therein is complete. Since, however, both of the conventional methods physically intercept the seepage water and the hazardous substances, harmful substances, and the like, which are contained therein, they leak easily from a place of breakage in the equipment used, even if the equipment used is slightly damaged.

For example, in the case of the former method, there has been a problem that, since the shielding rubber sheet is damaged when waste having projections is dumped thereon, as the shielding rubber sheet is easily scratched, the seepage water leaks from a place of breakage, and consequently the hazardous substances, harmful substances, and the like, which are contained therein, leak and diffuse. In the case of the latter method, there has been a problem that leakage and diffusion of the hazardous substances, harmful substances, and the like cannot be prevented when damage, such as cracks and the like, occurs in the concrete-made equipment by an earthquake, salt damage, and the like.

SUMMARY OF THE INVENTION

An object of the present invention is to provide an electrode apparatus that has been developed in order to prevent environmental pollution by aforementioned leakage and diffusion of hazardous substances, harmful substances, and the like. That is, the electrode apparatus is one that is set around equipment, such as an aforementioned waste disposal landfill and the like, and that captures the hazardous substances, harmful substances, and the like, or renders them harmless by their oxidation/reduction reaction, to prevent them from leaking and diffusing into the ambient environment in the event of breakage of the equipment.

Other and further objects, features, and advantages of the invention will appear more fully from the following description, taken in connection with the accompanying drawings.

DETAILED DESCRIPTION OF THE INVENTION

Figure 1:
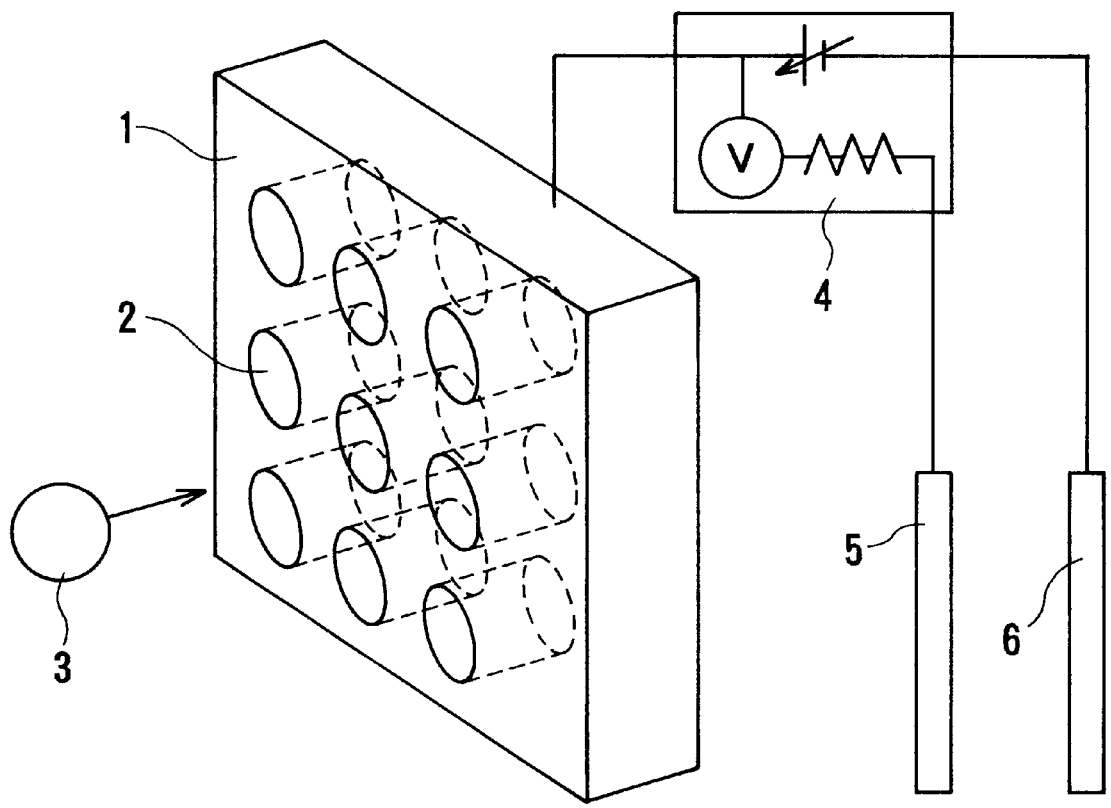
FIG. 1 is a schematic structural view showing an example of an embodiment of an electrode apparatus of the present invention.

The present inventor, having made many investigations devotedly in order to solve the aforementioned problems, has consequently attained the present invention.

According to the present invention, there are provided:

(1) An electrode apparatus, comprising an electrode composed of a conductor through which perforations are formed from a surface to a backing surface, wherein when the conductor is maintained at an electric potential sufficient to cause an oxidation or reduction reaction to occur in substances to be treated of a solution entered from an inlet of the perforations and passed through inside the perforations, the substances to be treated are captured or rendered harmless by their oxidation or reduction reaction inside the perforations, and the solution whose concentration is lowered is diffused from an outlet of the perforations;

(2) The electrode apparatus as stated in the above (1), wherein the substances to be treated are hazardous substances, harmful substances, and the like (hereinafter referred to as hazardous or harmful substances), and wherein an environment containing them is the soil around a general waste disposal landfill or an industrial waste disposal landfill, or an industrial treatment aqueous solution (for example, industrial wastewater); and (3) The electrode apparatus as stated in the above (1) or (2), wherein the perforations are cylindrical, and wherein the length of the perforation between the two surfaces is approximately twofold, or more, longer than the radius of the perforation.

As a preferable embodiment of the present invention, the following electrode apparatuses can be mentioned:

(4) An electrode apparatus, comprising an electrode composed of a plate conductor which has perforations, the length of the perforation between two surfaces of the plate conductor being approximately twofold, or more, longer than the radius of the perforation, wherein when the plate conductor is maintained at an electric potential, for a counter electrode provided under ground, sufficient to cause an oxidation or reduction reaction to occur in substances to be treated of a solution entered from an inlet of the perforations and passed through inside the perforations, the substances to be treated are captured or rendered harmless by their oxidation or reduction reaction inside the perforations, and the solution whose concentration is lowered is diffused from an outlet of the perforations;

(5) The electrode apparatus as stated in the above (4), wherein the substances to be treated are hazardous or harmful substances, and wherein an environment containing them is the soil around a general waste disposal landfill or an industrial waste disposal landfill, or an industrial treatment aqueous solution (for example, industrial wastewater); and (6) The electrode apparatus as stated in the above (4) or (5), wherein the perforations are cylindrical.

According to the present invention, phenomenon of transfer or diffusion of hazardous or harmful substances, from an environment containing the substances in high concentration can be prevented. Then the soil around a general waste disposal landfill or industrial waste disposal landfill is prevented from transferring or diffusing the hazardous or harmful substances to an environment, such as the soil, river, an underground water vein, distant from the former environment.

The present invention resides in:

setting an electrode having perforations, which are maintained at an oxidation/reduction electric potential sufficient to capture these hazardous or harmful substances, or to render them harmless, for the environment containing a high concentration of hazardous or harmful substances, thereby capturing the hazardous or harmful substances, or rendering them harmless, by an oxidation/reduction reaction when a solution containing a high concentration of them passes through the perforations.

An example of an embodiment of the electrode apparatus of the present invention is shown in FIG. 1. An electrode (conductor) 1, preferably in a plate shape, is made from iron, aluminum, copper, steel materials, such as carbon steel or stainless steel, or other metals; graphite, or organic substances, such as conductive polymers and the like, and it has a structure through which perforations (electrode hole) 2 is bored. The preferable shape of the perforation is cylindrical, but it is possible to use perforations having another crosswise profile, such as a polygon and the like. The number of perforations is not restricted, and an appropriate number can be chosen depending on the material's physical strength and the like. Preferably, the ratio of the total area of the cross section of the perforations occupied in unit area of the cross section of the electrode; that is, the so-called opening ratio, is set at 20% or above. The hole diameter of a perforation is not specifically restricted. The particularly preferable diameter of a perforation is within a range of 0.5 to 2 mm (radius of 0.25 to 1 mm). However, a diameter exceeding the range may be used, as long as the ratio of the length to the electrode hole diameter is set sufficiently (preferably 1 or above, more preferably 5 or above) so as to capture the hazardous or harmful substances, or render them harmless on the inner surface of the perforations, when the hazardous or harmful substances passes through the perforations.

The electrode 1 is set in a conductive environment, such as the soil, an aqueous solution, and the like. The electrode 1 is connected through an electric source 4 to a reference electrode 5, used as standard for electric potential, and a counter electrode 6, which is a counter party to which an oxidation-reduction electric current is caused. As the reference electrode, may be used an electrode having a stable electric potential, such as a saturated copper sulfate electrode ($Cu|CuSO_4$), a silver chloride electrode ($Ag|AgCl$), and the like. Alternatively, an iron or steel plate having a large surface area may be used in the soil and the like. The counter electrode used may be a conductive substance, such as metal and the like.

As the electric source, it is sufficient to use a conventional system that can maintain the electrode at a constant electric potential for proceeding an electrode reaction. This is shown in, for example, "New Edition Electrochemical Measurement Method" Electro-Chemical Society of Japan, PP. 9~10 (September 1988). The electric source 4 has a function of automatically controlling the electric potential between the electrode 1 and the counter electrode 6, and an electric current flowing between them, so as to automatically keep the electric potential between the electrode 1 and the reference electrode 5 constant cooperatively with that, while detecting the electric potential between the electrode 1 and the reference electrode 5. When the electrode is maintained at an appropriate oxidation-reduction electric potential to the reference electrode, to capture the hazardous or harmful substances (substances to be treated) 3, or to render them harmless, the hazardous or harmful substances, transferring in the direction of the arrow shown in FIG. 1 are oxidized or reduced on the inner surface of the perforations while diffusing in the perforations. At this time, an oxidation-reduction electric current flows between the electrode and the counter electrode 6 according to the electrode reaction. The electric potential of the electrode is set at a nobler (more positive) electric potential (higher electric potential) than an equilibrium electric potential of the oxidation-reduction reaction of these substances, in the case of an oxidation reaction, or at an ignobler (more negative) electric potential (lower electric potential) than the equilibrium electric potential of the oxidation-reduction reaction of these substances, in the case of a reduction reaction, depending on the kind of the hazardous or harmful substances. In this case, the electric potential of the electrode is set at an electric potential apart from the equilibrium electric potential by preferably approximately 0.4~0.5 V or above, to increase the rate of the oxidation-reduction reaction on the surface of the electrode up to a rate by which the reaction proceeds completely.

As the oxidation-reduction reaction on the surface of the electrode used in the present invention, in the case of, for example, a metal ion, there is a reaction in which the metal ion is deposited as metal in the perforations and captured by using primarily the following reduction reaction:

$$M^{m+} + me^- \rightarrow M \quad (1)$$

wherein $M^{m+}$ is a metal ion, and M is a metal. Further, in the case of an organic compound and the like, the compound is decomposed primarily by the following oxidation or reduction reaction, to make it harmless:

$$O \rightarrow O' + ne^- \quad (2)$$

$$O + ne^- \rightarrow O'' \quad (3)$$

wherein O is an organic compound and the like, and O', O", and the like are harmless compounds produced by an oxidation-reduction reaction of the O. In these reactions, sometimes plural compounds are concerned with for reactants as well as products, and sometimes the reactants and products are compounds having an electric charge (ion) or having no electric charge. Further, sometimes the harmless compounds are finally produced through plural reactions of two steps or more. As an example of reaction (1) above described, a reaction in which lead is deposited in an aqueous solution by a reduction reaction is shown in reaction (4). As an example of reaction (2) above described, a reaction in which formalin (formaldehyde) converts to carbon dioxide by an oxidation reaction, also in an aqueous solution, is shown in reactions (5) and (6) (two-step reaction).

$$Pb^{2+} + 2e^- \rightarrow Pb \quad (4)$$

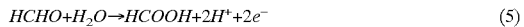

$$HCHO + H_2O \rightarrow HCOOH + 2H^+ + 2e^- \quad (5)$$

$$HCOOH \rightarrow CO_2 + 2H^+ + 2e^- \quad (6)$$

Figure 2:
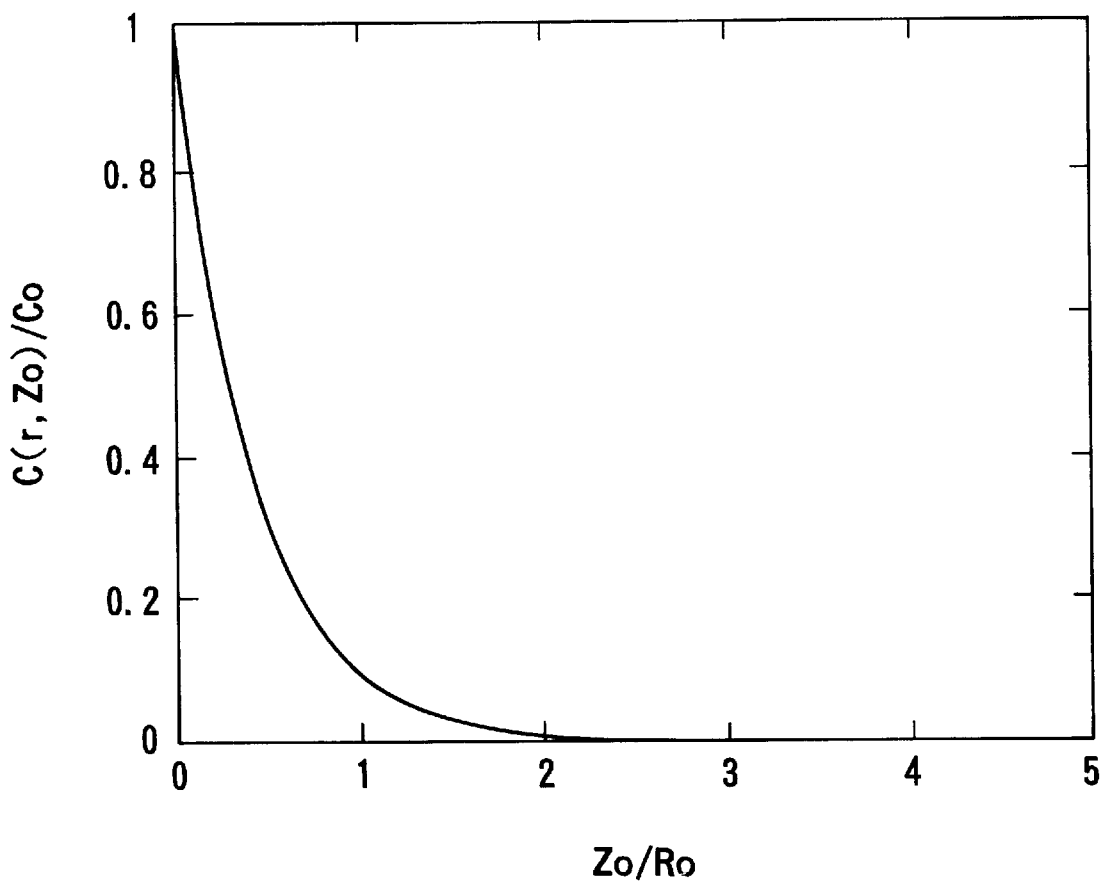
FIG. 2 is a graph in which the ratio of the material concentration at an outlet, to that at an inlet, of a cylindrical electrode hole, is plotted versus the ratio of the length to the radius of the electrode hole.

In the aforementioned electrode, when the perforations of the conductor are cylindrical, and when the electrode is maintained at an electrical potential so that the oxidation-reduction reaction proceeds at a sufficiently rapid speed and the hazardous or harmful substances are completely reacted on the inner surface of the perforations, and the concentration on the inner surface of the perforations becomes approximately zero, the concentration distribution of the hazardous or harmful substances inside the perforations can be obtained by the following equation:

$$C(r,z) = C_o \cdot J_o(-2.4048 r/R_o) \exp(-2.4048 z/R_o) \quad (7)$$

wherein $C(r,z)$ represents the material concentration at a place that is radius r and length (depth) z distant from the central portion of the inlet of the perforation; $C_o$ represents the material concentration at the central portion of the inlet of the perforation, $J_o$ represents the Bessel function of first kind, zero order, and $R_o$ represents the radius of the perforation. FIG. 2 shows the change in the material concentration at the outlet of the perforation, with the change of the perforation radius and the perforation length obtained by using equation (7). FIG. 2 shows the ratio of the change in the material concentration at an outlet section and an inlet section of the perforation ($C(r,Z_o)/C_o$) versus the ratio $Z_o/R_o$, when the perforation radius is $R_o$ and the perforation length is $Z_o$. As shown in FIG. 2, when the perforation length is twofold, or more, larger than the perforation radius, it is possible to lower the material concentration to approximately 1/100 or below. Accordingly, when carrying out the present invention, it is preferable for the perforation length to be approximately two times or more of the perforation radius, and, more preferably, by setting it at four times or more, thereby the diffusion of the hazardous or harmful substances can be almost completely prevented. In this case, plural electrodes may be used, stacked or placed side by side, so that the sum of the length of the perforation of the electrodes comes to the above-mentioned value.

Equation (7) can be applied equally to a substance having no electric charge, as well as to an electrically charged substance, such as an ion. Further, since equation (7) does not depend on a physical constant inherent in a substance, such as the diffusion coefficient of the substance, and the like, the above-mentioned result can be applied equally to any kind of substance, and it is not necessary to change the perforation length and the like dependently on the substance to be treated.

While it has been explained in the present invention that the reference electrode is one thing and the counter electrode is another, it is possible to omit the counter electrode by connecting electric wires used for the reference electrode and the counter electrode with the reference electrode, making the reference electrode have the function of the counter electrode. Thus it is possible to use only two electrodes of the electrode and the reference electrode. Further, since according to the present invention, the hazardous or harmful substances are captured and rendered harmless, only inside the perforations, it is also effective to coat the electrode surface, except the inner surface of the perforations, with an insulating resin and the like, in order to avoid excessive electrical-power consumption, suppressing the oxidation-reduction reaction at the insulated portion.

The electrode apparatus of the present invention can prevent the transfer and/or diffusion of hazardous or harmful substances into an environment having a low concentration of hazardous or harmful substances. This is attained by setting the electrode, having perforations that are maintained at an oxidation-reduction electric potential sufficient to capture the hazardous or harmful substances, or render them harmless, for an environment containing a high concentration of the hazardous or harmful substances. Thus the electrode captures the hazardous or harmful substances or renders them harmless by the redox reaction, when a solution containing a high concentration of the hazardous or harmful substances passes through the perforations. According to the present invention, the diffusion and/or leakage of the hazardous or harmful substances into the ambient environment because of breakage of a shielding sheet, exterior barrier equipment, and so on, which are set in a general waste disposal landfill or industrial waste disposal landfill, can be efficiently prevented. Then the industrial significance of the present invention is of great important.

The present invention is explained in greater detail below based on the following examples, which is illustrative and are not to be taken as limiting the invention.

EXAMPLE

Example 1

Figure 3:
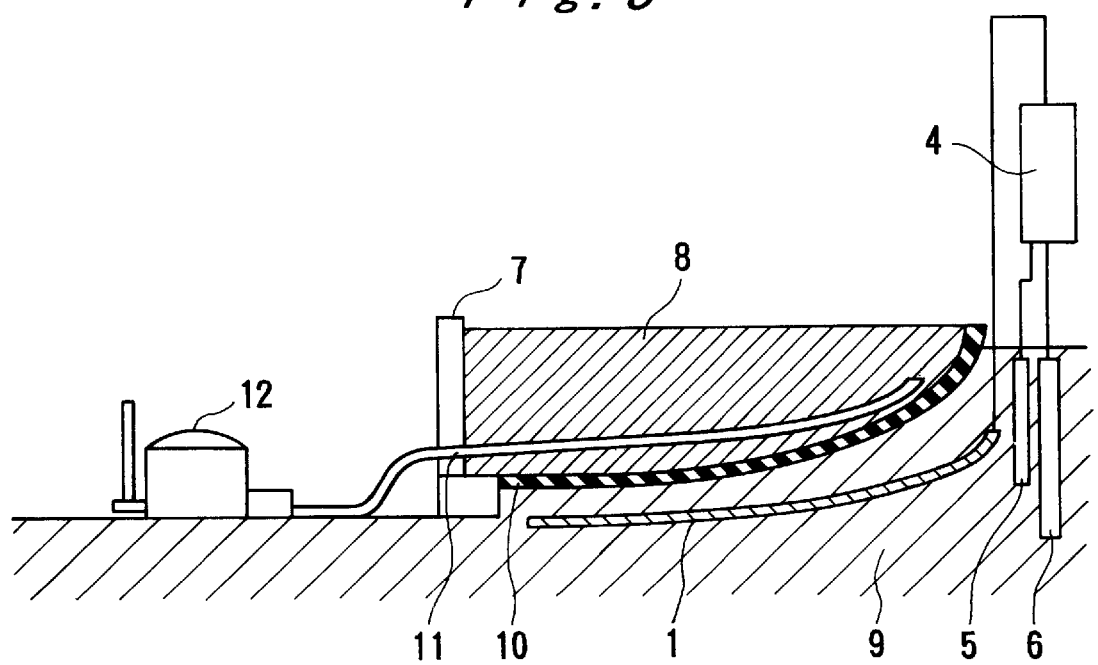
FIG. 3 is a view showing an example in which an electrode apparatus of the present invention is applied to a waste disposal landfill.
Figure 4:
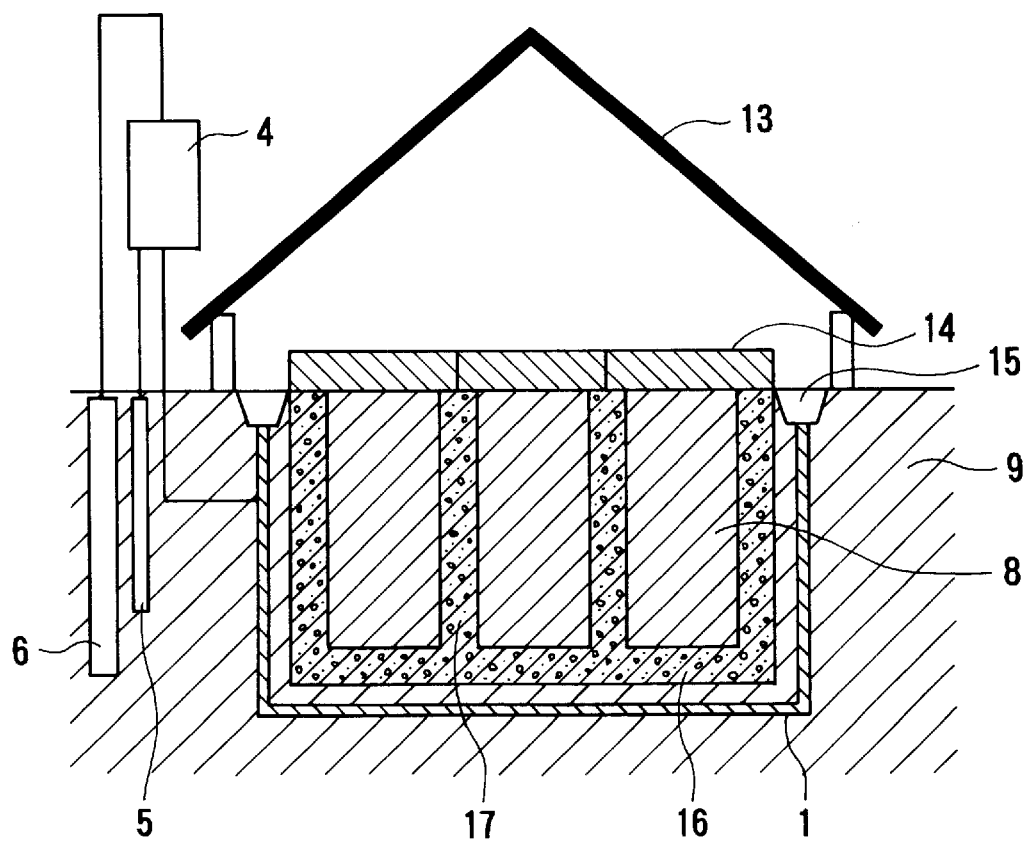
FIG. 4 is a view showing another example in which an electrode apparatus of the present invention is applied to a waste disposal landfill.
Figure 5:
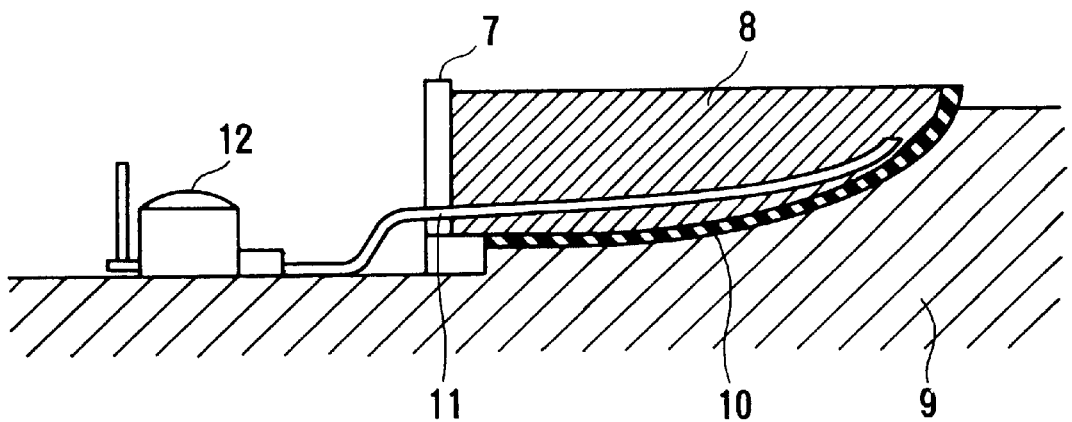
FIG. 5 is a view explaining a conventional technique of waste disposal.
Figure 6:
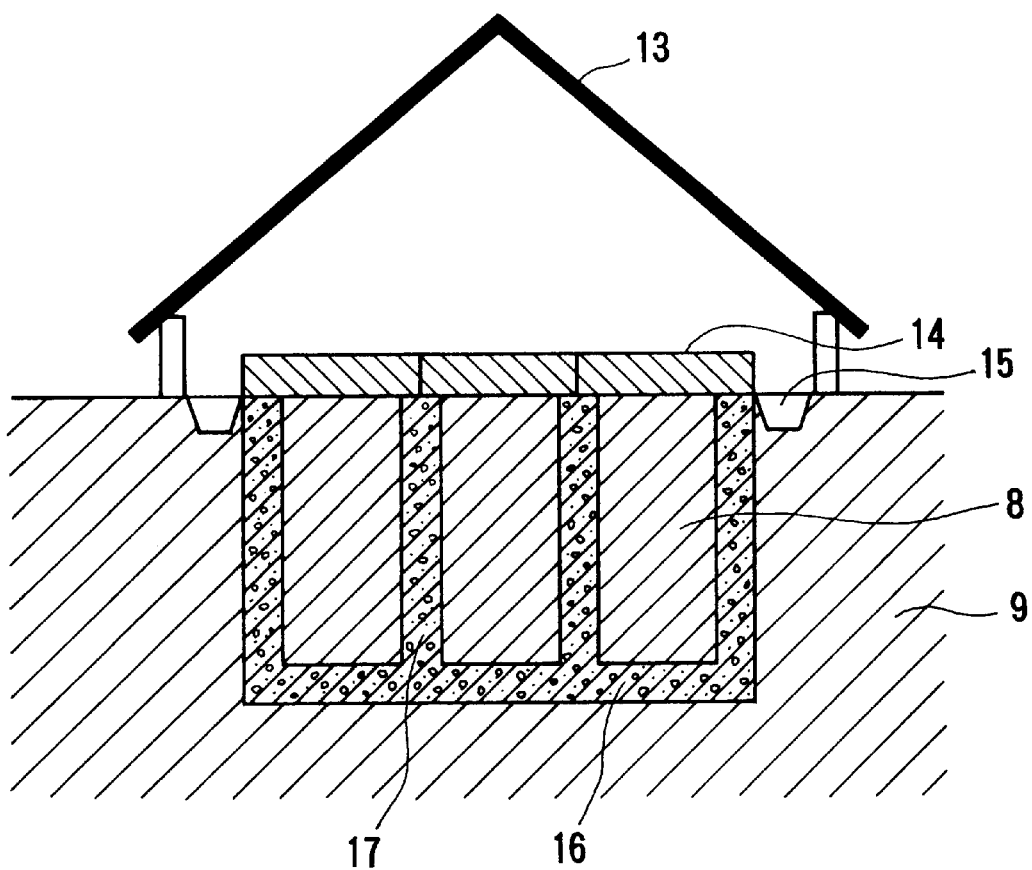
FIG. 6 is a view explaining another conventional technique of waste disposal.

Two examples are shown by reference to FIGS. 3 and 4. An electrode apparatus of the present invention is applied for the purpose of preventing a lead ion, which is contained in high proportion in seepage water, from diffusing into the ambient environment from the systems of a waste disposal landfill as shown in FIGS. 5 and 6, when a shielding sheet and exterior barrier equipment used in the system are damaged. Herein, the same symbol means the same members in the present specification and drawings.

FIG. 3 shows an example in which the present invention is applied to the system of the waste disposal landfill of FIG. 5. An electrode 1 to be used in the present invention is set by burying it in the soil in the vicinity of a shielding sheet 10. Alternatively, it may be set only in a water passageway, through which the seepage water flows into the underground water. An electric source 4, a reference electrode 5, and a counter electrode 6 are connected to the electrode 1, which is maintained at a constant electric potential in relation to the reference electrode 5. At this time, an electric current forms a circuit, in which it flows through the electric source 4, the electrode 1, and the conductive environment (soil) in which the electrode 1 is set, and it returns again to the electric source 4 via the counter electrode 6. While the reference electrode 5 is set in order to monitor the electric potential between the electrode 1 and the reference electrode 5, an electric current scarcely flows from the reference electrode 5 to the electric source. A plate of steel, copper, aluminum, and so on, 2 mm thick, is used for the electrode 1, a saturated copper sulfate electrode is used for the reference electrode 5, and a plate of steel, 2 mm thick, is used for the counter electrode. The surface of the steel plate used for the electrode 1 is coated with an insulating resin, such as enamel and the like, and through the steel plate, a cylindrical perforation 2, of 1 mm diameter, is drilled, at a rate of 25 perforations per 1 $cm^2$, so as to expose the surface of the metal only to the inner surface of the perforations. The opening ratio at this time is approximately 20%, and the ratio of the length to the perforation diameter is 4.

The lead ion is converted to metal lead by a reduction reaction of reaction (4). Since the equilibrium electric potential of the reduction reaction is −0.4 to −0.5 V at room temperature, when a saturated copper sulfate electrode is used for the reference electrode, it is possible to promote the reaction (4) at sufficient rate if the electric potential of the electrode is maintained at the order of approximately −0.9 V. If the electrode is maintained at this electric potential, the seepage water that leaks out of the waste 8, because of breakage of the shielding sheet 10, reaches the electrode, and the lead ion in the seepage water is reduced to metal lead in the perforations, and it is deposited and captured on the inner surface of the perforations, and it does not diffuse into the ambient soil or underground water downstream from the water passageway. For example, the concentration of lead ion in the seepage water of 100 ppm or above could be lowered to approximately 0 ppm.

FIG. 4 is another example in which the present invention is applied to a system of the waste disposal landfill as shown in FIG. 6. In this case, the electrode 1 is set in closely contact with the outside of the exterior-walled equipment 16, or it is set in the soil in the vicinity thereof, or it is set in a water passageway in the vicinity thereof. The electrode 1 is connected to the electric source 4, reference electrode 5, and counter electrode 6, and it is maintained at a constant electric potential. The shape, material, surface treatment, and the like of the electrode and the perforations to be used are the same as in the case of FIG. 3. Further, a reduction reaction of equation (4) is used, and the same reference electrode and counter electrode are used, and the electric potential is maintained similarly at approximately −0.9 V. When the electrode is maintained at this electric potential, lead ion in the seepage water that leaks from the waste 8, because of breakage of the exterior-walled equipment, is reduced to metal lead in the perforations, and it is deposited and captured on the inner surface of the perforations, and it does not diffuse into the ambient soil or the underground water downstream from the water passageway.

While the electrode was set outside the shielding sheet or the exterior-walled equipment in the above-described examples, the electrode, having proper thickness and mechanical strength, can be used as the shielding sheet or exterior-walled equipment itself. Further, the present invention can be used not only to prevent diffusion of hazardous or harmful substances, it can also be used as a monitoring apparatus for leakage of hazardous or harmful substances, not by forming the electrode in one-piece but by forming it into plural pieces, which are set around the waste disposal landfill, to each of which a voltage is loaded, to detect an electric current caused by an oxidation-reduction reaction of the hazardous or harmful substances, by means of an ammeter connected in series between the electrodes and the electric source.

Further, the present invention can be used not only in the soil, it can also be used in order to prevent diffusion of the hazardous or harmful substances into an area that does not contain them by setting the electrode of the invention in natural water, such as seawater, a river, and the like, or in an aqueous solution containing the hazardous or harmful substances, such as industrial wastewater and the like.

Having described our invention as related to the present embodiments, it is our intention that the invention not be limited by any of the details of the description, unless otherwise specified, but rather be construed broadly within its spirit and scope as set out in the accompanying claims.

What I claim is:

1. An electrode apparatus, comprising an electrode composed of a conductor through which perforations are formed from a surface to a backing surface and said perforations having a length (depth) capable of causing the oxidation or reduction reaction so that substances inside the perforations are treated, a reference electrode, and a counter electrode, wherein the reference electrode and counter electrode are connected to the electrode composed of the conductor through an electric source, and the electrode composed of the conductor is set in a conductive environment selected from the group consisting of soil and an aqueous solution, and wherein when the conductor is maintained at an electric potential capable of causing an oxidation or reduction reaction to occur in substances to be treated of a solution entered from an inlet of the perforations and passed through inside the perforations, by setting the electric potential of the electrode composed of the conductor, to an electric potential that is greater than or less than the equilibrium electric potential of the oxidation or reduction reaction by 0.4–0.5 V or more where the electric potential in the case of conducting the oxidation reaction is greater than the equilibrium electric potential and where the electric potential in the case of conducting the reduction reaction is lower than the equilibrium electric potential, the substances to be treated are captured or rendered harmless by their oxidation or reduction reaction inside the perforations and the treated solution is diffused from an outlet of the perforations.

2. The electrode apparatus as claimed in claim 1, wherein the substances to be treated are hazardous substances or harmful substances, and wherein an environment containing them is the soil around a general waste disposal landfill or an industrial waste disposal landfill, or an industrial treatment aqueous solution.

3. The electrode apparatus as claimed in claim 1, wherein the perforations are cylindrical, and wherein the length of the perforation between the two surfaces is approximately twofold, or more, longer than the radius of the perforation.

4. The electrode apparatus as claimed in claim 1, wherein the electrode is composed of a plate conductor which has cylindrical perforations, the length of the perforations between the two surfaces is approximately twofold, or more, longer than the radius of the perforation, and the plate conductor is maintained at an electric potential, with respect to the counter electrode provided under ground, thereby causing substances to be treated.

5. The electrode apparatus as claimed in claim 1, wherein the electrode is made from at least one selected from the group consisting of iron, aluminum, copper, carbon steel, stainless steel, graphite or conductive polymer.

6. The electrode apparatus as claimed in claim 1, wherein a cross section of the perforations per unit area is at least 20%.

7. The electrode apparatus as claimed in claim 1, wherein a diameter of each perforation is in a range of about 0.5–2 mm.

8. The electrode apparatus as claimed in claim 1, wherein the reference electrode is a $Cu/CuSO_4$ electrode or an Ag/AgCl electrode.

9. The electrode apparatus as claimed in claim 1, wherein the reference electrode is an iron plate or steel plate.

10. The electrode apparatus as claimed in claim 9, wherein the counter electrode is steel.

11. The electrode apparatus as claimed in claim 9, wherein the counter electrode also functions as a reference electrode.

12. The electrode apparatus as claimed in claim 1, wherein the electrode is set at an electric potential offset from an equilibrium electric potential by approximately 0.4–0.5 V or above.

13. The electrode apparatus as claimed in claim 12, wherein the insulating material is a resin.

14. The electrode apparatus as claimed in claim 1, wherein the electrode is coated, except an inner surface of the perforations, with an insulating material.

15. The electrode apparatus as claimed in claim 1, wherein the substances to be treated are heavy metal ions, and the reaction occurring inside the perforations is a reduction reaction.

16. The electrode apparatus as claimed in claim 1, wherein the counter electrode acts as the reference electrode.

17. The electrode apparatus as claimed in claim 1, wherein the perforations are polygonal.

18. A method for lowering the concentration of hazardous substances or harmful substances in a soil, comprising (a) placing an electrode apparatus in a conductive soil or an aqueous environment wherein the electrode apparatus comprises an electrode composed of a conductor through which perforations are formed from a surface to a backing surface and said perforations having a length (depth) capable of causing the oxidation or reduction reaction, a reference electrode, and a counter electrode, and wherein the reference electrode and counter electrode are connected to the electrode composed of the conductor through an electric source, and the conductor is maintained at an electric potential capable of causing an oxidation or reduction reaction, by setting the electric potential of the electrode composed of the conductor, to an electric potential that is less than or greater than the equilibrium electric potential of the oxidation-reduction reaction by 0.4–0.5 V or above where the electric potential in the oxidation reaction is greater than the electric potential in the reduction reaction, (b) capturing hazardous or harmful substances, (c) passing the hazardous or harmful substances through the perforations, (d) rendering the hazardous or harmful substances harmless by an oxidation or reduction reaction, and (e) diffusing the treated substances from the perforation from an outlet of the perforation.

19. An electrode apparatus, comprising an electrode composed of a conductor through which perforations are formed from a surface to a backing surface, and said perforations have a length (depth) capable of causing the oxidation or reduction reaction to enable substances to be treated inside the perforations, a reference electrode, and a counter electrode, wherein the reference electrode and counter electrode are connected to the electrode composed of the conductor through an electric source, and the electrode composed of the conductor is set in a conductive environment selected from the group consisting of soil and an aqueous solution, and wherein wherein the perforations have length and radius satisfying the following expression (7a), and wherein when the conductor is maintained at an electric potential capable of causing an oxidation or reduction reaction to occur in substances to be treated of a solution entered from an inlet of the perforations and passed through inside the perforations by setting the electric potential of the electrode composed of the conductor, to an electric potential that is greater than or less than the equilibrium electric potential of the oxidation or reduction reaction by 0.4–0.5 V or more where the electric potential in the case of conducting the oxidation reaction is greater than the equilibrium electric potential and where the electric potential in the case of conducting the reduction reaction is lower than the equilibrium electric potential, the substances to be treated are captured or rendered harmless by their oxidation or reduction reaction inside the perforations, and the treated solution whose concentration is lowered to the concentration lower than $C(r, Z_o)$ is diffused from an outlet of the perforations;

$$Z_o/R_o \geq (1/2.4048)\log_e(C(r,0)/C(r,Z_o)) \tag{7a}$$

wherein, r represents a radius distant from the axis of a center point within an inlet of the perforation;

$R_o$ represents the radius of the perforation;

$Z_o$ represents the length of the perforation;

$C(r, Z_o)$ represents the material concentration at the outlet of the perforation;

$C(r,0)$ represents the material concentration at the inlet of the perforation.

* * * * *